US00RE39811E

(19) United States
(12) Reissued Patent
Ogusu et al.

(10) Patent Number: US RE39,811 E
(45) Date of Reissued Patent: Sep. 4, 2007

(54) MUSICAL INFORMATION RECORDING AND REPRODUCING TECHNIQUE FOR USE WITH A RECORDING MEDIUM HAVING A UTOC AREA

(75) Inventors: Mikio Ogusu, Hamamatsu (JP); Kazunobu Fujiwara, Hamamatsu (JP); Kei Tanaka, Suginami-ku (JP)

(73) Assignee: Yamaha Corporation, Hamamatsu-shi (JP)

(21) Appl. No.: 09/247,895

(22) Filed: Feb. 10, 1999

Related U.S. Patent Documents

Reissue of:
(64) Patent No.: 5,602,811
Issued: Feb. 11, 1997
Appl. No.: 08/510,377
Filed: Aug. 2, 1995

(51) Int. Cl.
*G11B 7/00* (2006.01)

(52) U.S. Cl. ..... 369/30.05; 369/124.06; 369/124.14; 369/30.07; 369/30.25; 369/30.37; 369/47.28; 369/84; 84/624; 84/668

(58) Field of Classification Search ..... 369/47.1, 369/47.12, 47.13, 47.16, 47.28, 53.1, 53.31, 369/59.1, 124.01, 32.01; 360/32, 48; 84/624, 84/625, 635, 636, 634, 639, 651, 652
See application file for complete search history.

(56) References Cited

U.S. PATENT DOCUMENTS 5,194,682 A * 3/1993 Okamura et al.
5,561,649 A * 10/1996 Lee et al.
5,570,340 A * 10/1996 Lee et al.

FOREIGN PATENT DOCUMENTS

| | | | |
|---|---|---|---|
| JP | 62-38581 | * | 2/1987 |
| JP | 2-42282 | * | 3/1990 |
| JP | 6-4086 | * | 1/1994 |

* cited by examiner

*Primary Examiner*—Muhammad Edun
(74) *Attorney, Agent, or Firm*—Pillsbury Winthrop Shaw Pittman LLP

(57) ABSTRACT

There is generated a rhythm corresponding to a designated tempo and meter of a music piece to be recorded. Performance of a musical instrument is started at specific timing according to the generated rhythm, and the musical information resulting from the performance is recorded onto an MD (Mini Disk). The address on the MD read out when the performance of the music piece is started is retrieved as a start address of the music piece. After the recording, the retrieved start address is recorded onto the UTOC (User's-table-of-contents) area of the disk along with the designated tempo and meter. By reading out the start address, tempo and meter to calculate a measure number and start address of a desired measure on the basis of the read out information, display of a measure number being currently reproduced and quick access to the starting point of any desired measure can be achieved. In applications where plural channels are involved, part information indicative of performance parts assigned and recorded on the individual recording channels is also recorded onto the UTOC area. When necessary, the part information is visually displayed. In ping-pong recording, performance parts to be mixed are additively synthesized on the basis of the recorded part information and then recorded onto the UTOC area as part information for a channel where the mixed output is to be recorded.

5 Claims, 9 Drawing Sheets

| TRACK NO. | MUSIC PIECE START ADDRESS | TEMPO | METER |
|---|---|---|---|
| | | | |
| | | | |
| k | Ts | t | N |
| | | | |
| | | | |

| | | | | |
|---|---|---|---|---|
| CH1 | PART 1 | PART 2 | PART 3 | PART 4 |
| | PART 5 | PART 6 | PART 7 | PART 8 |
| | PART 9 | PART 10 | PART 11 | PART 12 |
| | PART 13 | PART 14 | PART 15 | PART 16 |
| CH2 | | | | |
| | | ↑ | | |
| | | | | |
| | | | | |
| CH3 | | | | |
| | | ↑ | | |
| | | | | |
| | | | | |
| CH4 | | | | |
| | | ↑ | | |
| | | | | |
| | | | | |

PART INFORMATION OF UTOC AREA

| | | | | |
|---|---|---|---|---|
| CH1 | DR | | | |
| | | | | |
| | | | | |
| | | | | |
| CH2 | | | | |
| | | | | |
| | | | | |
| | | | | |
| CH3 | | | | |
| | | | | |
| | | | | |
| | | | | |
| CH4 | | | | |
| | | | | |
| | | | | |
| | | | | |

PART INFORMATION OF UTOC AREA

| | | | | |
|---|---|---|---|---|
| CH1 | DR | | | |
| | | | | |
| | | | | |
| | | | | |
| CH2 | BG | | | |
| | | | | |
| | | | | |
| | | | | |
| CH3 | | | | |
| | | | | |
| | | | | |
| | | | | |
| CH4 | | | | |
| | | | | |
| | | | | |
| | | | | |

PART INFORMATION OF UTOC AREA

| | | | | |
|---|---|---|---|---|
| CH1 | DR | | | |
| | | | | |
| | | | | |
| | | | | |
| CH2 | BG | | | |
| | | | | |
| | | | | |
| | | | | |
| CH3 | RG | | | |
| | | | | |
| | | | | |
| | | | | |
| CH4 | | | | |
| | | | | |
| | | | | |
| | | | | |

PART INFORMATION OF UTOC AREA

| | | | | |
|---|---|---|---|---|
| CH1 | DR | | | |
| | | | | |
| | | | | |
| | | | | |
| CH2 | BG | | | |
| | | | | |
| | | | | |
| | | | | |
| CH3 | RG | | | |
| | | | | |
| | | | | |
| | | | | |
| CH4 | DR | BG | RG | |
| | | | | |
| | | | | |
| | | | | |

MUSICAL INFORMATION RECORDING AND REPRODUCING TECHNIQUE FOR USE WITH A RECORDING MEDIUM HAVING A UTOC AREA

Matter enclosed in heavy brackets [ ] appears in the original patent but forms no part of this reissue specification; matter printed in italics indicates the additions made by reissue.

TITLE OF THE INVENTION

Musical Information Recording and Reproducing Technique for Use with a Recording Medium having a UTOC Area

BACKGROUND OF THE INVENTION

The present invention relates generally to a musical information recording and reproducing technique for use with a recording medium having a UTOC (User's-table-of-contents) area.

More particularly, the present invention relates to musical information recording and reproducing devices and a musical information recording medium which permit display of a measure being currently reproduced and selective quick access to the starting point of any desired measure.

The present invention also relates to a multichannel mixing recorder for recording input musical signals onto optionally selected channels and mixing the musical signals recorded on the plural channels, and more particularly to such a multichannel mixing recorder which allows a user to readily verify the assignment of various performance parts to individual channels to thereby achieve smooth multiplex recording and editing.

On recording media such as a CD (Compact Disk), MD (Mini Disk) and DCC (Digital Compact Cassette), there are recorded musical information of music pieces and address information associated therewith. Thus, during reproduction from the media, the address of every point of the music piece being currently reproduced can be displayed in a succesive manner. Additionally, information indicative of the respective starting points (heads) of the individual music pieces is also recorded on the media as TOC (Table of Contents) information so that the starting point of any desired music piece can be immediately accessed on the basis of this TOC information.

In musical education, or other cases where a recorded musical instrument performance is reproduced for practices on the instrument, it may be very convenient if a player is informed of which measure in the score is being currently reproduced by a reproducing device. It may be even more convenient if the starting point of a specific measure can be immediately accessed by mere designation of a unique number allocated to that measure. However, none of the conventionally known CD, MD and DCC playing devices were capable of achieving such measure-by-measure display and starting point access, although they could permit display of the varying addresses (passage of time) and starting point access for each of the music pieces recorded. Consequently, the known CD, MD and DCC playing devices were not so convenient for purposes like musical education and musical instrument practices.

Further, in the known CD, MD or DCC playing devices, multichannel recording is done by first performing rhythm parts to record the performed rhythm parts onto optionally designated individual channels ("initial recording"), then performing one or more other parts, while reproducing the recorded rhythm parts, to record the other parts onto other channels ("overdubbing"), and finally reproducing and mixing together the recorded performance parts of all the channels so as to ultimately output the resultant mixed performance parts through two (right and left) channels ("mixdown"). Where relatively many performance parts are involved, the multichannel recording is done by first overdubbing and mixing some of the performance parts, then temporarily transferring the resultant mixed performance parts onto an empty channel ("ping-pong recording") so as to record other performance parts onto the channels and have become empty due to the ping-pong recording, and finally mixing down the recorded performance parts of all the channels.

However, with the conventionally known CD, MD or DCC playing device, the multichannel recording involves preparing a planning sheet where there are written, for each of the steps, the assignment of the performance parts to the individual channels and various settings such as effectors to be applied to the performance parts. The operator (i.e., person in charge) handles the channel assignment etc. in accordance with the planning sheet. However, whenever it was desired to ascertain, during recording, which parts have so far been assigned to which channels, the operator had to refer to the planning sheet.

SUMMARY OF THE INVENTION

It is therefore an object of the present invention to provide musical information recording and reproducing devices and a musical information recording medium which permit display of a measure number being currently reproduced and quick access to the starting point of any desired measure.

It is another object of the present invention to provide a multichannel recorder which allows a user to readily verify the assignment of performance parts to individual channels without having to referring to a planning sheet so as to achieve smooth multiplex recording and editing of musical information.

In order to accomplish the first object, the present invention provides a recording device for recording musical information of a music piece onto a recording medium having address information previously recorded thereon, which device comprises a tempo designation section for designating a tempo of a music piece to be recorded, a meter designation section for designating meter of the music piece, a rhythm generation section for generating, in light or sound form, a rhythm corresponding to the tempo and meter designated by the tempo and meter designation sections, a start timing instruction section for instructing timing to start performance of the music piece, an input section for inputting musical information of the music piece, a music piece recording section for recording, onto the recording medium, the musical information of the music piece input by the input section, a start address retrieval section for retrieving, as a start address of the music piece, the address information read out from the recording medium when the timing to start performance of the music piece is instructed by the instruction section, and a tempo, meter and start address recording section for recording, onto a predetermined recording area of the recording medium, information indicative of the tempo and meter designated by the tempo and meter designation sections and the start address retrieved by the retrieval section.

According to the recording device thus arranged, a specific rhythm is generated by the rhythm generation section in response to designation of a desired tempo and meter of a music piece to be recorded. Performance of a musical instrument or the like is started at specific timing according to the generated rhythm, and the performance (performed sound) information resulting from the performance is recorded onto the recording medium by the music piece recording section. The address on the recording medium read out when the performance of the music piece is started is retrieved, as a start address of the music piece, by the retrieval section. After completion of the musical information recording, the retrieved start address of the music piece is recorded onto the predetermined recording area (corresponding to the UTOC area in the later-described embodiments) of the medium along with information indicative of the designated tempo and meter. With this arrangement, display of a measure number being currently reproduced and quick access to the starting point of any desired measure can be achieved by an appropriate reproducing device reading the information indicative of the music piece start address, tempo and meter and calculating the measure number, start address of the desired measure etc. on the basis of the read information.

The present invention also provides a reproducing device for reproducing recorded information from a recording medium having musical information of a music piece recorded thereon along with associated address information and also having other information indicative of a tempo, meter and start address of the music piece recorded on a predetermined recording area thereof, which device comprises a reading section for, prior to reproduction of the music piece, reading the information indicative of the tempo, meter and start address from the predetermined recording area of the recording medium, a reproduction section for reproducing the musical information of the music piece along with the associated address information, a measure number calculation section for calculating a measure number n being currently reproduced, by performing an arithmetic operation of $n=INT\{(Ta-Ts)/N\cdot t\}+1$, where Ts represents in seconds the start address of the music piece read by the reading section, Ta represents in seconds an address being currently reproduced, N represents the meter read by the reading section, t represents in seconds the tempo read by the reading section and $INT\{(Ta-Ts)/N\cdot t\}$ represents an integer part of $(Ta-Ts)/N\cdot t$, and a measure number display section for displaying the measure number calculated by the calculation section.

According to the reproducing device thus arranged, a measure number n can be displayed by reading the information indicative of the music piece start address, tempo and meter from the predetermined recording area (corresponding to the UTOC area in the later-described embodiments) of the medium and calculating the measure number n corresponding to the current reproduction address.

The present invention also provides a reproducing device for reproducing recorded information from a recording medium having musical information of a music piece recorded thereon along with associated address information and also having other information indicative of a tempo, meter and start address of the music piece recorded on a predetermined recording area thereof, which device comprises a reading section for, prior to reproduction of the musical information of the music piece, reading the information indicative of the tempo, meter and start address of the music piece from the predetermined recording area, a reproduction section for reproducing the musical information of the music piece along with the associated address information, a measure number designation section for designating a measure number in the music piece, a measure start address calculation section for calculating a start address Ta of the measure number designated by the measure designation section, by performing an arithmetic operation of $Ta=Ts+(n-1)\cdot N\cdot t$, where Ts represents in seconds the start address of the music piece read by the reading section, n represents the measure number designated by the designation section, N represents the meter read by the reading section and t represents in seconds the tempo read by the reading section, and a measure start address search section for searching, on the recording medium, for the measure start address calculated by the calculation section so that reproduction of the music piece is started at the calculated measure start address.

According to the reproducing device thus arranged, by reading the information indicative of the music piece start address, tempo and meter of the music piece from the predetermined recording area (corresponding to the UTOC area in the later-described embodiments) of the medium and in response to designation of a measure number n whose starting point is to be accessed, the start address Ta of the designated measure number n is accurately calculated and thereby quick access to the staring point of the measure can be achieved for precise, selective reproduction of the measure.

The present invention also provides a recording medium which has musical information of a music piece recorded thereon along with corresponding address information and also has other information indicative of a tempo, meter and start address of the music piece recorded on a predetermined recording area thereof. With this recording medium, display of a measure number being currently reproduced and quick access to the starting point of any desired measure can be achieved by an appropriate reproducing device reading the information indicative of the music piece start address, tempo and meter and calculating the measure number, start address of the desired measure etc. on the basis of the read information.

The present invention mentioned above should be found very convenient because of the features to permit display of a measure number being currently reproduced and quick access to the starting point of any desired measure.

Further, in order to accomplish the second object, the present invention provides a multichannel recorder for recording musical information onto a recording medium, which comprises a mixing section for supplying externally input musical signals to recording channel inputs of channels optionally designated from among plural channels of the recording medium, a part information input operation section for inputting part information indicative of performance parts of the externally input musical signals, a recording and reproduction control section for recording, onto a table-of-contents information recording area of the recording medium, the part information input by the operation section as part information for the designated channels, and reproducing the part information from the table-of-contents information recording area, and a display section for displaying the part information for each of the channels reproduced from the table-of-contents information recording area of the recording medium. According to the multichannel recorder thus arranged, part information indicative of performance parts assigned to the individual channels is recorded on the table-of contents recording area (corresponding to the UTOC area in the later-described embodiments). By reading out the part information from the table-of contents recording area and displaying the read-out part information, the user is allowed to readily verify the assignment of various performance parts to the individual channels without a need to refer to a planning sheet, to thereby achieve smooth multiplex recording and editing of musical information.

Typically, the mixing section is constructed to mix the musical signals reproduced from plural channels optionally designated for reproduction from among the channels of the recording medium, so as to supply the mixed musical signals to a recording channel input of another channel optionally designated for recording from among of the channels, and wherein the recording and reproduction control section synthesizes the part information of the channels optionally designated for reproduction among the part information reproduced from the table-of-contents area of the recording medium, so as to automatically record the synthesized part information as part information for the other channel designated for recording. It is allowed to automatically create part information for the recording channel by use of the part information already recorded for the reproducing channels. This will reduce the necessary time and labor for entering the performance parts.

For better understanding of the above and other features of the present invention, the preferred embodiments of the invention will be described in detail below with reference to the accompanying drawings.

DETAILED DESCRIPTION OF THE PREFERRED EMBODIMENTS

With reference to FIGS. 1 to 4, a description will hereinafter be made on an embodiment where the principle of the present invention is applied to an MD recording/reproducing device and an MD.

Figure 1:
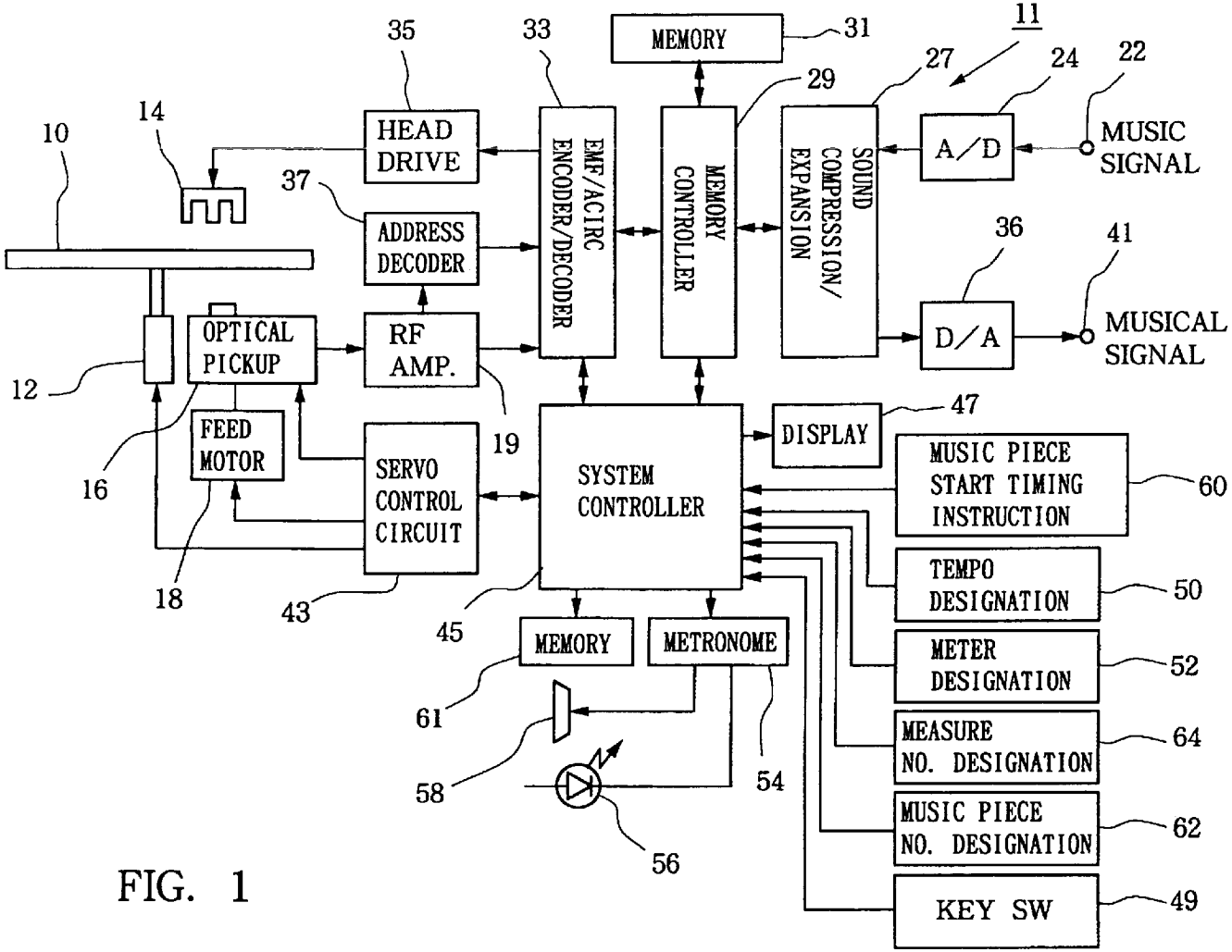
FIG. 1 is a block diagram illustrating the general hardware structure of an MD recording/reproducing device in accordance with an embodiment of the present invention.

In FIG. 1, the MD 10 is driven to rotate by a spindle motor 12. Above and below the MD 10 are provided a recording head (magnetic head) 14 and an optical pickup 16 in opposed relation to each other. The recording head 14 and optical pickup 16 are mechanically interconnected for movement along the radius of the MD 10 via a feed motor 18.

In recording, each musical signal input through an input terminal 22 is converted by an A/D converter 24 into digital representation and then converted by a sound compression/expansion section 27 into compressed form. The thus-compressed signal is temporarily stored into a memory (shock-proof memory) 31 via a memory controller 29 and then subjected to an EFM (Eight-to-fourteen Modulation) process performed via an EFM/ACIRC (Advanced Cross Interleave Reed-Solomon)-encoder/decoder 33. A head drive section 35 modulates a head drive signal with the EFM signal to drive the recording head 14. The optical pickup 16 irradiates a recording laser beam of predetermined power onto the recording surface of the disk 10 which is opposite to the recording head 14, to thereby effect recording based on magnetic field modulation. In reproduction, on the other hand, the optical pickup 16 irradiates a reproducing laser beam of lower power to read the recorded information from the disk 10.

In reproduction, each RF signal output from the optical pickup 16 is amplified via an RF amplifier 19 and then EFM-demodulated by the EFM/ACIRC-encoder/decoder 33. The thus-demodulated program signal (musical signal) is temporarily stored into the memory 31 under the control of the memory controller 29 and is then read out to be expanded by the sound compression/expansion section 27. The expanded signal from the compression/expansion section 27 is converted by a D/A converter 36 into analog representation and then output via an output terminal 41.

Position (address) information, which is recorded in advance on pre-grooves in the disk 10, is decoded via an address decoder 37 for utilization by a system controller 45. A servo control circuit 43, by use of the output signal from the optical pickup 16, performs focusing, tracking and feed control of the optical pickup 16 as well as rotation control of the spindle motor 12. The rotation control of the spindle motor 12 is performed in such a manner that wobble signal can be detected at a predetermined frequency.

During recording and reproduction, the system controller 45 controls the entire operation of the MD recording/reproducing device 11. A display 47 displays a position, music piece number, measure number etc. being recorded or reproduced by the device 11. A key switch section 49 outputs a signal to instruct recording, reproduction, temporary stop, stop or the like, in response to the user's operation on any of key switches contained in the key switch section 49.

A tempo designation operator 50 is an operating member, such as ten keys or a knob, for the user to designate a desired tempo of a music piece to be recorded. A meter designation operator 52 comprises an operating member, such as a knob or switch, for the user to designate a desired time or meter (such as triple or quadruple meter) of a music piece to be recorded. The meter designation operator 52 may comprise operating members for designating any of rhythm types like waltz, march etc., rather than the above-mentioned operating member for directly designating the meter.

The system controller 45 receives the designated tempo and meter so as to actuate a metronome 54 to generate a rhythm (corresponding to the tempo and meter). The metronome 54 is provided with LEDs 56 and speaker 58 so as to light any of the LEDs in correspondence to the designated tempo and audibly generate the corresponding rhythm via the speaker 58.

A music piece number designation operator 62 and a measure number designation operator 64 comprise operating members, such as ten keys, for designating a music piece number and a measure number, respectively, during reproduction. Further, a music piece start timing instruction operator 60 includes an operating member for instructing a start (beginning of the first measure) of a music piece to be recorded, and it outputs a timing signal (trigger signal) when the user activates a foot switch or the like at predetermined performance start timing according to the rhythm generated by the metronome 54. Alternatively, the timing signal may be automatically output by detecting the first performance action on a musical instrument (performance start)—in such a case, the performing section such as a keyboard of the musical instrument itself functions as the music piece start timing instruction operator 60. A memory 61 is provided for storing the designated tempo and meter, address information corresponding to the music piece start timing, and UTOC (User's-table-of-contents) information read out from the disk 10.

Next, a description will be made on an example of the recording and reproducing control performed by the system controller 45.

(1) Recording Control

A desired tempo and meter of a music piece to be recorded are designated via the tempo and meter designation operators 50 and 52, respectively, and the designated tempo and meter are stored into the memory 61. Thus, the metronome 54 generates a rhythm corresponding to the designated tempo and meter in sound and light. Then, after having placed the disk 10 in the recording condition, the player or user activates the timing instruction operator 60 at specific timing corresponding to the rhythm generated from the generator 54 by listening to or viewing the generated rhythm, so as to initiate a performance (this activation of the operator 60 is unnecessary where it is done automatically). Once a music piece start timing instruction is given from the operator 60, the system controller 45 retrieves the address information read out from the MD 10 to store it into the memory 61 as a music piece start address.

Figures 2, 3:
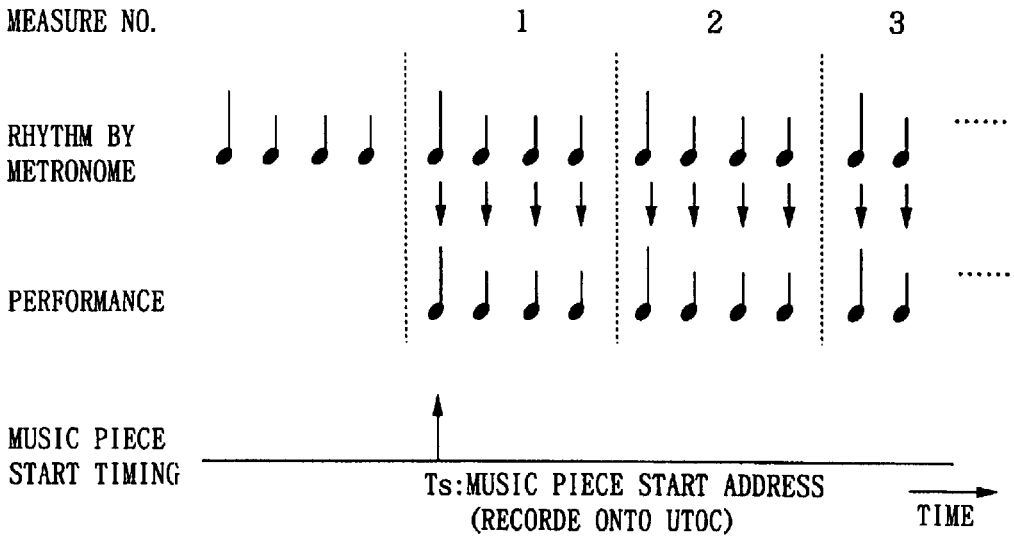
FIG. 2 is a diagram explanatory of an example of tempo/meter/music start address information generated as UTOC information.
FIG. 3 is a diagram explanatory of a recording operation of the MD recording and reproducing device.

FIG. 2 is a diagram explanatory of exemplary relationships between the rhythm generated by the metronome 54, performance and music piece start timing instruction where the performance is started in four-four (4/4) meter. During the performance, the rhythm generation and control of recording rate on the MD 10 are effected in synchronism with each other on the basis of a same system clock.

Upon termination of the performance, the tempo information, meter information and address information of the music piece start position are read out from the memory 61, generated as UTOC information corresponding to the tempo, meter and music piece start address information, and then recorded onto the UTOC area of the MD 10. FIG. 3 shows an example of the UTOC information thus recorded. According to the embodiment, the UTOC information may include the track (music piece) number on the assumption that a plurality of music pieces are recorded onto the same disk 10. The tempo and meter information, instead of being individually recorded, may be recorded as the product of their respective values.

(2) Reproducing Control

Once the disk 10 is set in the MD recording/reproducing device 11, the UTOC information stored in the UTOC area of the disk 10 is automatically loaded into the memory 61. Then, in response to the player's designation of a music piece number and predetermined reproducing operation, the start address of the designated music piece number is read out from the memory 61, and the position indicated by the read-out address is searched for or retrieved so that the music piece is reproduced from its very beginning.

While the music piece is reproduced, the passage of time is displayed on the basis of simultaneously read-out address information. Also, the system controller 45 carries out the following arithmetic operation so as to display a measure number being currently reproduced in a successive manner:

$$n=\mathrm{INT}\{(Ta-Ts)/N\cdot t\}+1 \quad (1)$$

where Ta represents in seconds the address being currently reproduced, Ts the music piece start address in seconds, N the meter, t the tempo in seconds, and $\mathrm{INT}\{(Ta-Ts)/N\cdot t\}$ the integer part of $(Ta-Ts)/N\cdot t$. In response to the player's designation of music piece and measure numbers and predetermined operation, the system controller 45 calculates the start address Ta of the designated measure number of the designated music piece number on the basis of the following equation:

$$Ta=Ts+(n-1)\cdot N\cdot t \quad (2)$$

Figure 4:
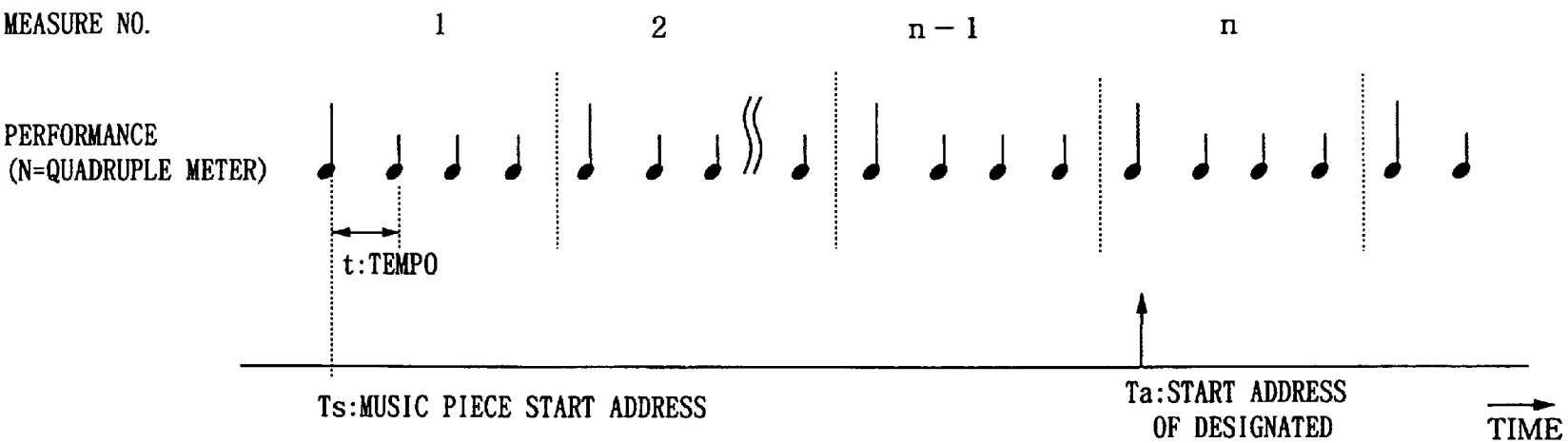
FIG. 4 is a diagram explanatory of a measure search operation performed during reproduction.

Then, the system controller 45 searches for the calculated address Ta so that reproduction starts at the beginning of the designated measure. FIG. 4 shows the search operation performed when measure number n is designated.

Although the embodiment has been described above in connection with a case where the principle of the present invention is applied to an MD recording/reproducing device, the invention may of course be applied to other kinds of recording/reproducing device which use other recording media such as different type optical disks, optical magnetic disks, magnetic tapes and magnetic disks.

According to the invention having the above-described features, display of a measure number being currently reproduced and quick access to the starting point of any desired measure can be achieved by just reading the information indicative of the music the piece start address, tempo and meter and calculating the measure number, start address of the desired measure etc. on the basis of the read information. Consequently, the invention will be very conveniently used in musical education and practices on a musical instrument.

Next, with reference to FIGS. 5 to 11, another embodiment of the present invention will be described in relation to a case where the principle of the invention is applied to a four-channel MD recorder 1.

Figures 6, 7:
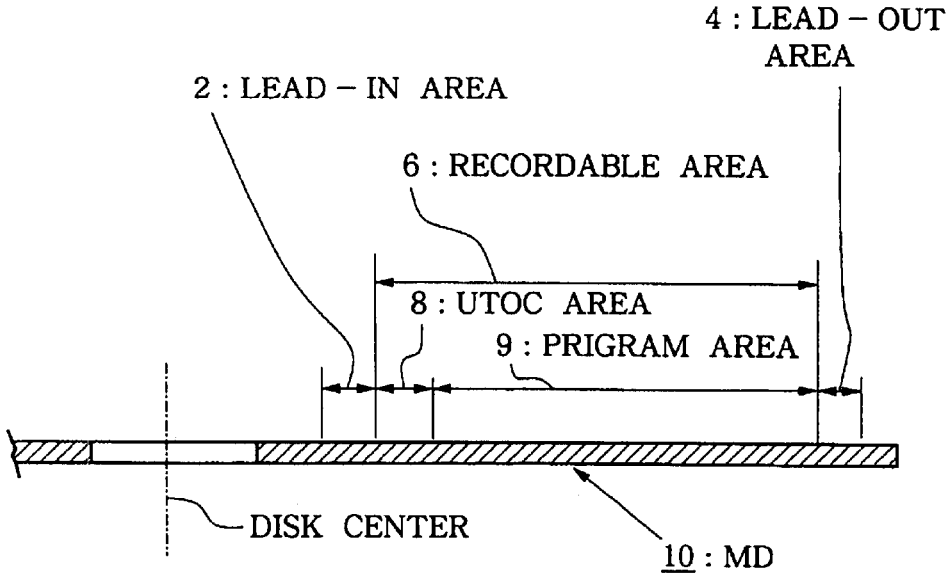
FIG. 6 is a sectional view of an MD showing the format of the disk.
FIG. 7 is a diagram illustrating an example of part information recorded on the UTOC area of the MD in FIG. 2.

FIG. 6 shows the disk format of an MD 10 for use with the recorder 1. A lead-in area 2 is disposed along inner-most circumference of the disk 10, and a lead-out area 4 is disposed along the outer-most circumference of the disk 10.

Between the lead-in and lead-out area 2 and 4 is provided a recordable area 6 available for recording by the user. In the inner-most region of the recordable area 6, there is provided a UTOC area (User's-table-of-contents recording area) 8 where part information is recorded as will be later described, while in the outer-most region, there is provided a program area 9 for storing program information (in this embodiment, musical information) for four channels.

In FIG. 7, there is shown an example of the part information formation recorded on the UTOC area 8 of the disk 10. Here, in order to deal with a possible increase in the number of performance parts due to repetition of "ping-pong recording", 12-performance part names are recorded, for each of the four channels CH1–CH4, in alphabetical abbreviations (e.g., drum part is recorded as "DR", vocal part as "VOC" and keyboard part as "KEY").

Figure 5:
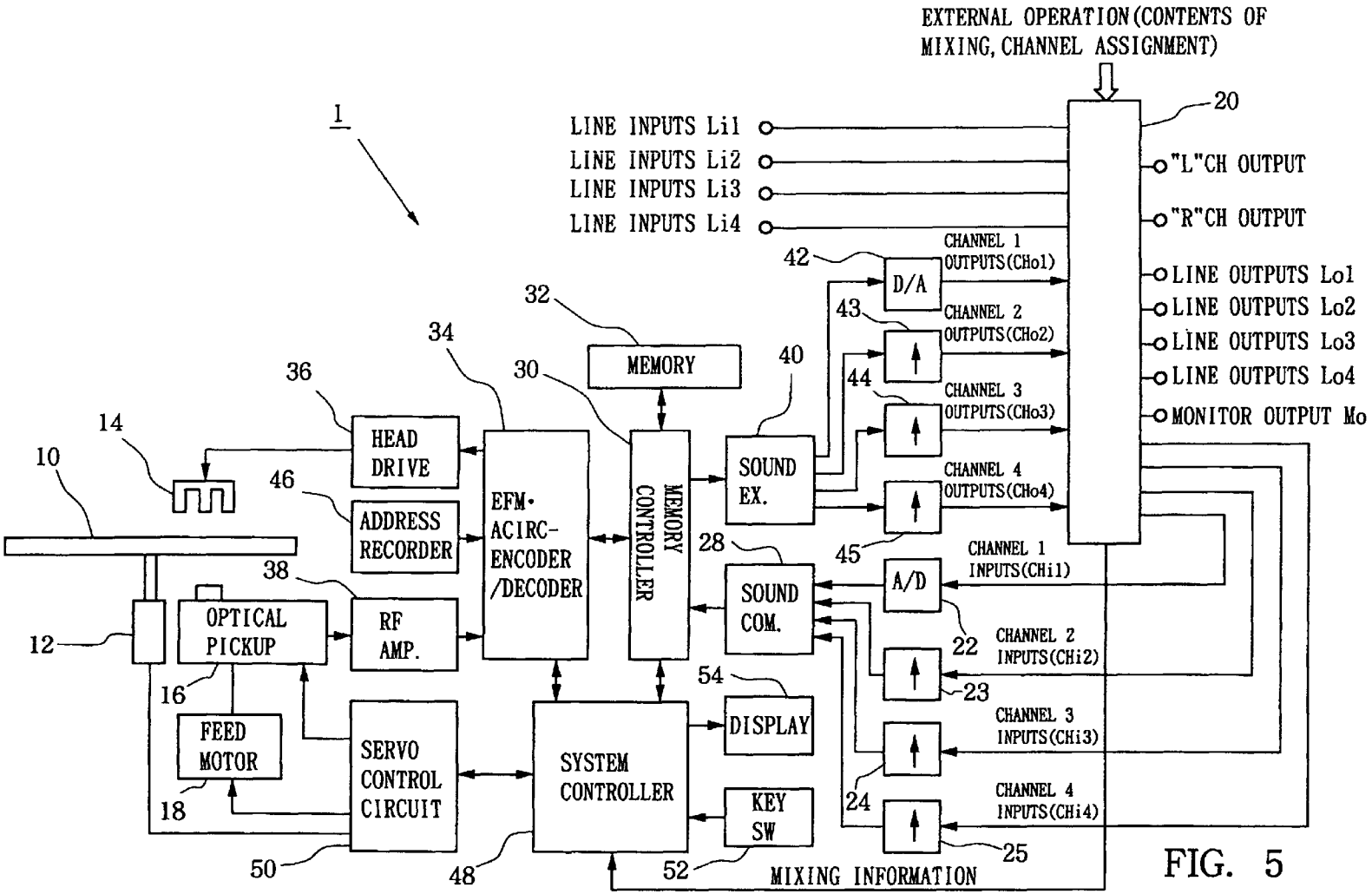
FIG. 5 is a system block diagram illustrating another embodiment where the principle of the present invention is applied to a four-channel MD recorder.

FIG. 5 shows the systematic arrangement of the four-channel MD recorder 1 which performs multichannel recording by use of the above-mentioned disk 10. Similarly to the embodiment of FIG. 1, the MD 10 is driven to rotate by a spindle motor 12. Above and below the MD 10 are provided a recording head (magnetic head) 14 and an optical pickup 16 in opposed relation to each other. The recording head 14 and optical pickup 16 are mechanically interconnected for movement along the radius of the MD 10 via a feed motor 18.

To line inputs Li1 to Li4 are input respective musical signals from outside the MD recorder 1. A mixer (mixing means) 20 receives the musical signals supplied through the lines Li1 to Li4, and musical signals reproduced from the MD 10 and supplied through channel outputs CHo1 to CHo4. Then, in response to the user's external operation for setting the contents of desired mixing, channel assignment, etc., the mixer 20 provides any of the received musical signals singly or in mixed form to channel inputs CHi1 to CHi4, or to line outputs Lo1 to Lo4 and monitor output Mo. The mixer 20 also provides mixdown output to the right and left channels "R"CH and "L"CH. The mixer 20 also provides a system controller 48 with mixing information that indicates various settings for desired mixing based on the user's external operation, such as the contents of initial recording, overdubbing, ping-pong recording, and mixdown).

In recording, each musical signal supplied from the mixer 20 to the channel inputs CHi1 to CHi4 is converted by a corresponding A/D converter 72–75 into digital representation and then converted by a sound compression section 28 into compressed form. The thus-compressed signal is temporarily stored into a memory (shock-proof memory) 32 via a memory controller 30 and then read out to be subjected to an EFM (Eight-to-fourteen Modulation) process performed via an EFM/ACIRC-encoder/decoder 34. A head drive section 35 modulates a head drive signal with the EFM signal to drive the magnetic recording head 14. The optical pickup 16 irradiates a recording laser beam of predetermined power onto the recording surface of the disk 10 which is opposite to the recording head 14, to thereby effect recording based on magnetic field modulation.

In reproduction, on the other hand, readout from the MD 10 of the recorded information is executed by actuating the optical pickup 16 to irradiate a reproducing laser beam onto the disk 10. Each RF signal that is then output from the optical pickup 16 is amplified via an RF amplifier 38 and then EFM-demodulated by the EFM/ACIRC-encoder/decoder 34. The thus-demodulated program signal (musical signal) is temporarily stored into the memory 32 under the control of the memory controller 30 and is then read out for signal expansion by a sound expansion section 40. The expanded signal from the expansion section 40 is converted by a corresponding D/A converter 82–85 into analog representation and then provided to the mixer 20 via the corresponding channel output CHo1–CHo4.

As earlier mentioned in connection with the embodiment of FIG. 1, position (address) information, which is recorded in advance on pre-grooves in the disk 10, is decoded via an address decoder 46 for utilization by the system controller 48. A servo control circuit 90, by use of the output signal from the optical pickup 16, performs focusing, tracking and feed control of the optical pickup 16 as well as rotation control of the spindle motor 12. The rotation control of the spindle motor 12 is performed in such a manner that wobble signal is detected at a predetermined frequency.

The system controller 48 controls the entire operation of the MD recorder 1. Further, as a part information recording/reproducing control means, the system controller 48 controls recording and reproduction of the part information onto and from the UTOC area of the MD 10. A key switch section 92 includes keys for use by the user to instruct recording, reproduction, stop etc., and also includes alphanumeric keys etc., as a part information input operator means, for use by the user to enter a desired performance part name. A display 94 displays addresses (passage of time) and also displays the part information for each of the channels reproduced from the UTOC area of the MD 10 (the display 94 may display the part information only when the user so instructs by operating a predetermined key).

Now, an example of the multichannel recording performed by the four-channel MD recorder 1 of FIG. 5 will be described step by step, with reference to FIGS. 8 to 11, of which FIGS. 8A, 9A, 10A and 11A show the connecting conditions of the mixer 20 in the respective steps of the multichannel recording and FIGS. 8B, 9B, 10B and 11B show the contents of part information recorded in the corresponding steps in the UTOC area of the MD 10.

(1) Step 1: Sound or musical signals for the drum part are recorded onto channel 1 (FIGS. 8A and 8B)

Figures 8A, 8B:
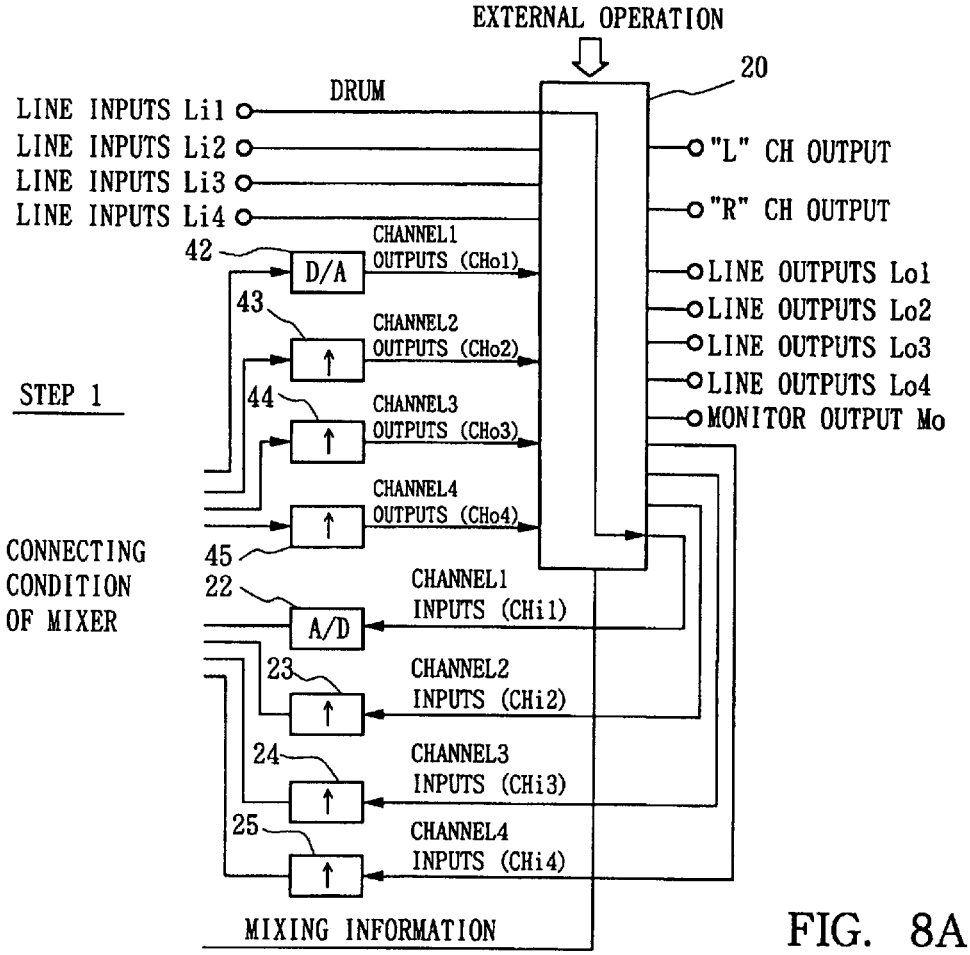
FIG. 8A is a block diagram showing the connecting condition of a mixer in a first step of multichannel recording performed by the four-channel MD recorder of FIG. 5.
FIG. 8B is a diagram showing part information recorded on the UTOC area in the first step of the multichannel recording.

1) The microphone output for the drum part is connected to line input Li1.
2) The connecting condition of the mixer 20 is set in such a manner to interconnect line input Li1 and channel input CHi1.
3) From mixing information supplied by the mixer 20, the system controller 48 detects that line input Li1 and channel input CHi1 have been interconnected.
4) The system controller 48 causes the display 94 to make a display which prompts the user to enter a desired performance part name.
5) The user uses the key switch section 92 to enter a performance part name "DR", for example.
6) The entered part name is temporarily stored into a predetermined region of the memory 32.
7) A recording key in the key switch section 92 is activated by the user to initiate sound recording.
8) After completion of the recording, the system controller 48 retrieves the part information from the memory 32 and records the retrieved information onto the UTOC area of the MD 10 (FIG. 8B).

(2) Step 2: Sound signals for the bass guitar part are recorded onto channel 2 while channel 1 is monitored (FIGS. 9A and 9B).

1) The information on the UTOC area of the MD 10 is reproduced so as to store into the memory 32 the part information having so far been recorded on the UTOC area.

Figures 9A, 9B:
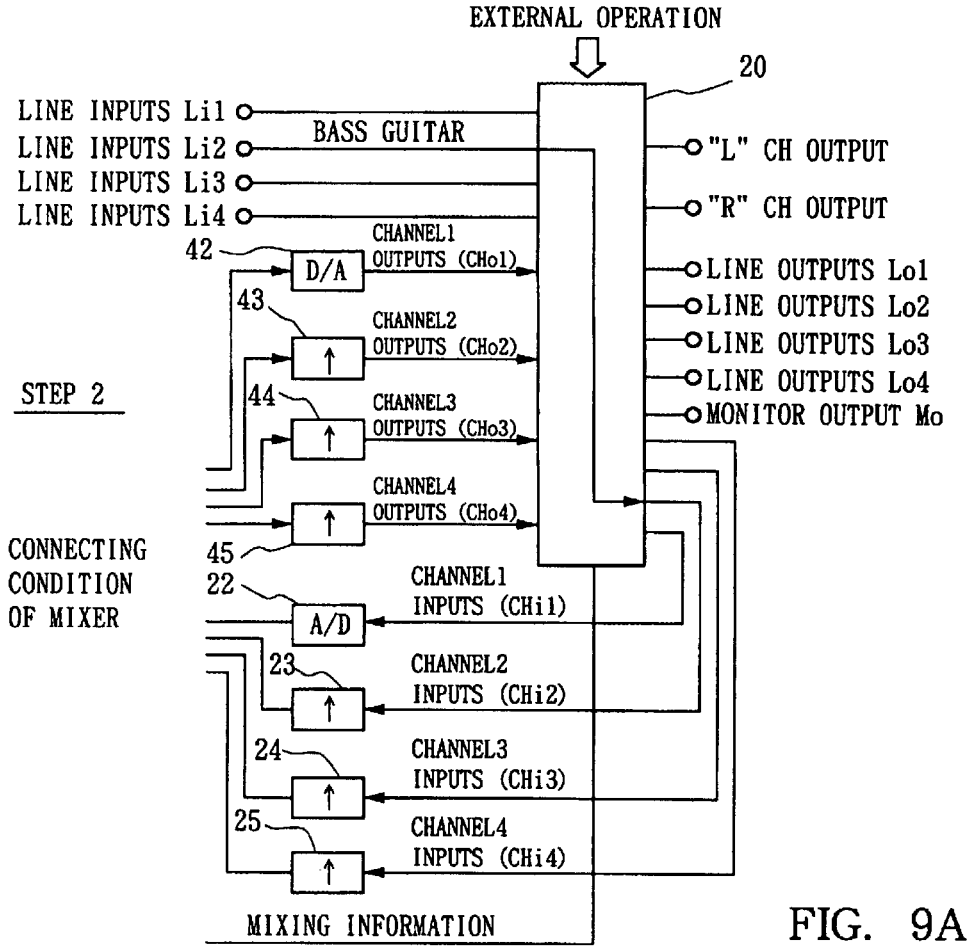
FIG. 9A is a block diagram showing the connecting condition of the mixer in a second step of the multichannel recording.
FIG. 9B is a diagram showing part information recorded on the UTOC area in the second step of the multichannel recording.

2) Sound recording is performed in a similar manner to step 1, and in response to the user's entry of, for example, "BG" as a performance part name for channel 2, part information recording onto the UTOC area of the MD 10 is effected as shown in FIG. 9B.

(3) Step 3: Sound signals for the rhythm guitar part are recorded onto channel 3 while channels 1 and 2 are monitored (FIGS. 10A and 10B).

1) The information on the UTOC area of the MD 10 is reproduced so as to store into the memory 32 the part information having so far been recorded on the UTOC area.

Figures 10A, 10B:
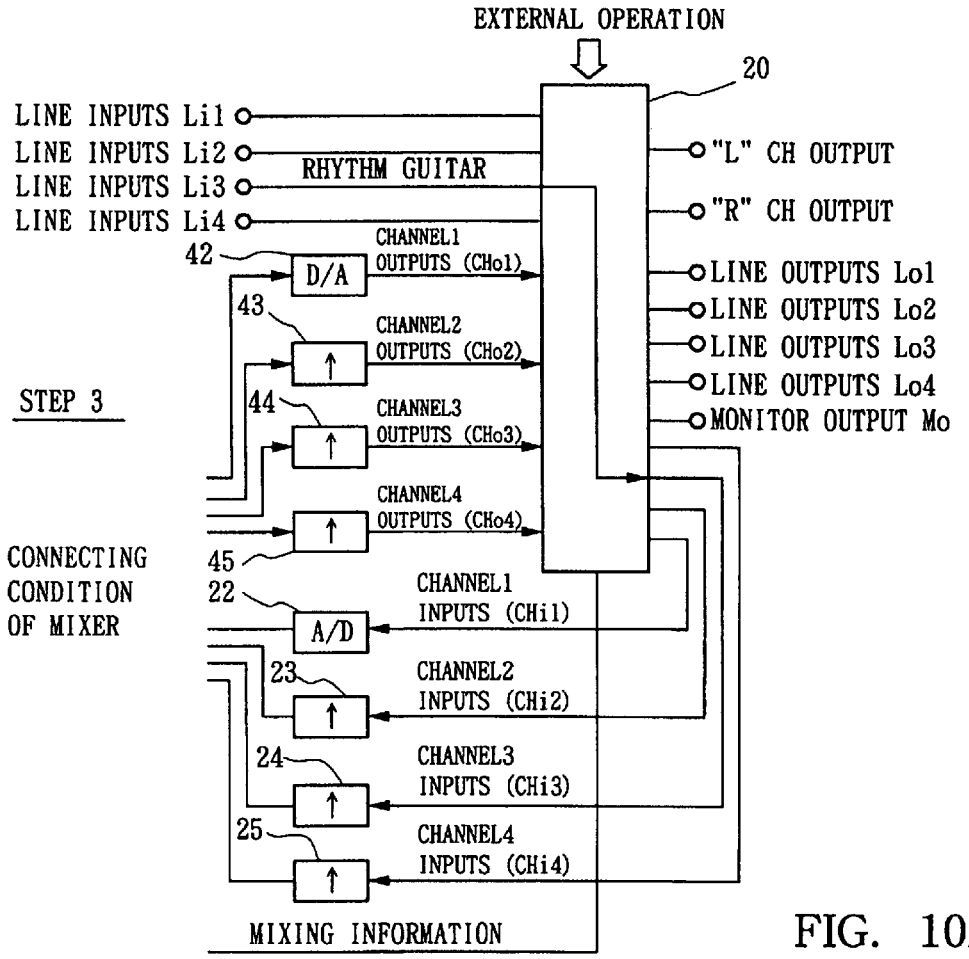
FIG. 10A is a block diagram showing the connecting condition of the mixer in a third step of the multichannel recording.
FIG. 10B diagram showing part information recorded on the UTOC area in the third step of the multichannel recording.

2) Sound recording is performed in a similar manner to steps 1 and 2, and response to the user's entry of, for example, "RG" as a performance part name for channel 3, part information recording onto the UTOC area of the MD 10 is effected as shown in FIG. 10B.

Figures 11A, 11B:
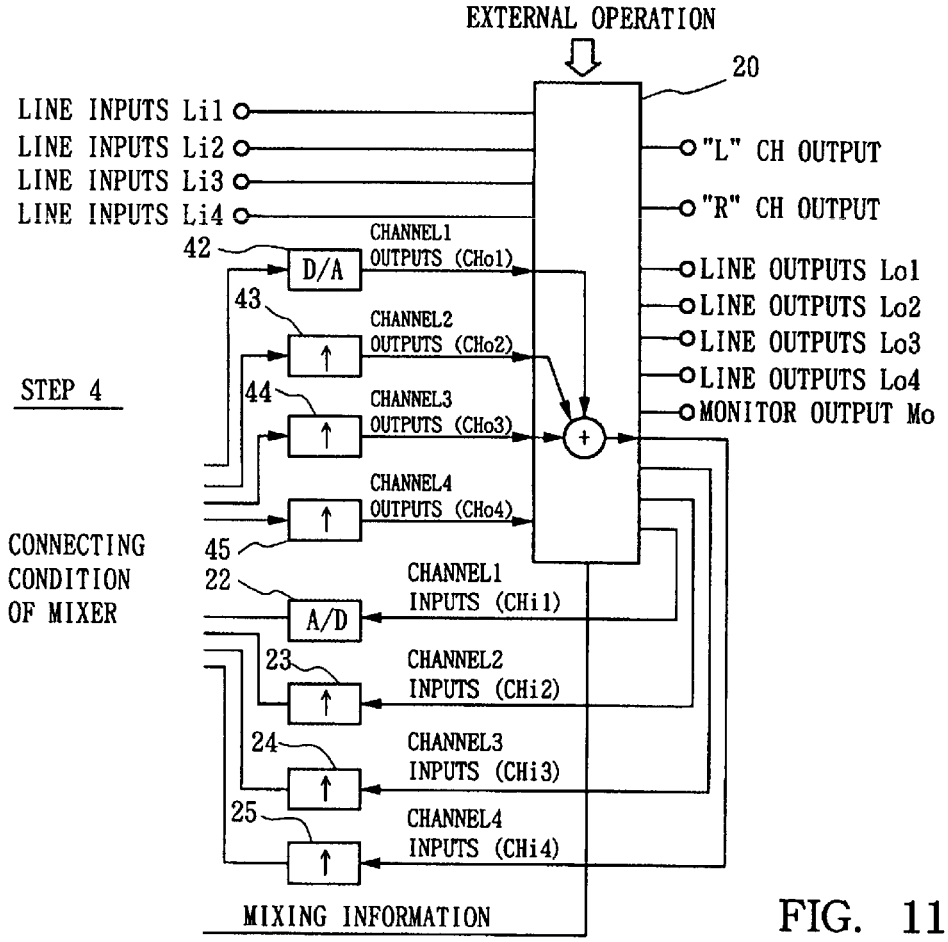
FIG. 11A is a block diagram the connection condition of the mixer in a fourth step of the multichannel recording, and FIG. 11B diagram showing part information recorded on the UTOC area in the fourth step of the multichannel recording.

(4) Step 4: The sound signals recorded on channels 1, 2 and 3 are mixed and then ping-pong recorded onto channel 4 (FIGS. 11A and 11B).

1) The information on the UTOC area of the MD 10 is reproduced so as to store into the memory 32 the part information having so far been recorded on the UTOC area.

2) The connecting condition of the mixer 20 is set in such manner to mix channel outputs CHo1, CHo2 and CHo3 and then provide the mixed result to channel input CHi4.

3) From mixing information supplied by the mixer 20, the system controller 48 detects the settings in the mixer 20.

4) The recording key in the key switch section 92 is activated by the user to initiate sound recording. But, this time, the user is not prompted to enter a desired performance part because there is no performance part to be newly performed. Then, the system controller 48 automatically additively synthesizes "DR", "BG" and "RG" and adds the synthesized names, as performance part names for channel 4, to the part information of the memory 32.

5) After completion of the recording, the system controller 48 retrieves the part information from the memory 32 to thereby update the recording on the UTOC area of the MD 10 (FIG. 11B).

Where a new part performance input from outside the recorder 1 is to be simultaneously mixed in the ping-pong recording, the user is prompted to enter the name of the new performance part. Further, where plural music pieces are recorded onto a single MD 10, the part information may be managed independently for each music piece.

While performance part names are entered by use of alphanumeric keys in the embodiment of FIG. 5, there may be provided key switches corresponding to the individual performance parts so that any desired performance part may be entered at one touch on selected one of plural key switches that are provided in corresponding relation to the individual performance part names. Further, while the embodiment has been described as recording the part information onto the UTOC area after the sound recording in each step, the part information may alternatively be recorded before the sound recording in each step. Furthermore, although the embodiment has been described as reading out the part information from the MD 10 whenever the step is initiated, it is not necessary to do so if the part information recorded up to the last step is caused to remain stored in the memory 32. Moreover, while the embodiment has been described above as applied to an MD recorder, the present invention is also applicable to multichannel recorders using other kinds of recording media.

According to the embodiment of FIG. 5 thus arranged, by just reading out the part information from the UTOC area and displaying the read-out part information, the user is allowed to readily verify the assignment of various performance parts to the individual channels without a need to refer to a planning sheet, to thereby achieve smooth multiplex recording and editing of musical information.

What is claimed is:

1. A recording device for recording musical information of a music piece onto a recording medium having address information previously recorded thereon said device comprising:

tempo designation means for designating a tempo of a music piece to be recorded;

meter designation means for designating meter of said music piece;

rhythm generation means for generating, in light or sound, a rhythm corresponding to the tempo and meter designated by said tempo and meter designation means;

start timing instruction means for instructing timing to start performance of said music piece;

input means for inputting musical information of said music piece;

music piece recording means for recording, onto the recording medium, the musical information of said music piece input by said input means;

start address retrieval means for retrieving, as a start address of said music piece, the address information read out from the recording medium when the timing to start performance of said music piece is instructed by said instruction means, and tempo, meter and start address recording means for recording, onto a predetermined recording area of the recording medium, information indicative of the tempo and meter designated by said tempo and meter designation means and the start address retrieved by said retrieval means.

2. A reproducing device for reproducing recorded information from a recording medium having musical information of a music piece recorded thereon along with associated address information and also having other information indicative of a tempo, meter and start address of the music piece recorded on a predetermined recording area thereof, said device comprising:

reading means for, prior to reproduction of the music piece, reading the information indicative of the tempo, meter and start address from the predetermined recording area of the recording medium;

reproduction means for reproducing the musical information of the music piece along with the associated address information;

measure number calculation means for calculating a measure number n being currently reproduced, by performing an arithmetic operation of $$n=\mathrm{INT}\{(Ta-Ts)/N\cdot t\}+1$$

where Ts represents in seconds the start address of the music piece read by said reading means, Ta represents in seconds an address being currently reproduced, N represents the meter read by said reading means, t represents in seconds the tempo read by said reading means and $\mathrm{INT}\{(Ta-Ts)/N\cdot t\}$ represents an integer part of $(Ta-Ts)/N\cdot t$, and measure number display means for displaying the measure number calculated by said calculation means.

3. A reproducing device for reproducing recorded information from a recording medium having musical information of a music piece recorded thereon along with associated address information and also having other information indicative of a tempo, meter and start address of the music piece recorded on a predetermined recording area thereof, said device comprising:

reading means for, prior to reproduction of the musical information of the music piece, reading the information indicative of the tempo, meter and start address of the music piece from the predetermined recording area;

reproduction means for reproducing the musical information of the music piece along with the associated address information;

measure number designation means for designating a measure number in the music piece;

measure start address calculation means for calculating a start address Ta of the measure number designated by said measure designation means, by performing an arithmetic operation of $$Ta=Ts+(n-1)\cdot N\cdot t$$

where Ts represents in seconds the start address of the music piece read by said reading means, n represents the measure number designated by said designation means, N represents the meter read by said reading means and t represents in seconds the tempo read by said reading means, and measure start address search means for searching, on the recording medium, for the measure start address calculated by said calculation means so that reproduction of the music piece is started at the calculated measure start address.

*4. A reproducing device for reproducing recorded information from a recording medium having musical information of a music piece recorded thereon along with associated address information and also having other information indicative of a tempo, meter and start address of the music piece recorded on a predetermined recording area thereof, said device comprising:*

*reading means for, prior to reproduction of the music piece, reading the information indicative of the tempo, meter and start address from the predetermined recording area of the recording medium;*

*reproducing means for reproducing the musical information of the music piece along with the associated address information;*

*measure number calculation means for calculating a measure number corresponding to the address information being currently reproduced in accordance with the address information along with which the music information is currently reproduced and also with the start address, tempo, and meter read by said reading means; and*

*measure number display means for displaying the measure number calculated by said calculation means.*

*5. A reproducing device for reproducing recorded information from a recording medium having musical information of a music piece recorded thereon along with associated address information and also having other information indicative of a tempo, meter and start address of the music piece recorded on a predetermined recording area thereof, said device comprising:*

*reading means for, prior to reproduction of the musical information of the music piece, reading the information indicative of the tempo, meter and start address of the music piece from the predetermined recording area;*

*measure number designation means for designating a measure number in the music piece;*

*measure start address calculation means for calculating a start address of the measure number designated by said measure number designation means in accordance with the measure number designated by said measure number designation means and also with the start address, tempo and meter of the music piece read by said reading means;*

*measure start address search means for searching, on the recording medium, for the measure start address calculated by said calculation means; and*

*reproduction means for reproducing the music information of the music piece, starting from the measure start address detected by said measure start address search means.*

* * * * *